Patented June 5, 1951

2,556,126

UNITED STATES PATENT OFFICE 2,556,126

PROCESS FOR PREPARING MELAMINE

Henry A. Walter, Longmeadow, Mass., assignor to Monsanto Chemical Company, St. Louis, Mo., a corporation of Delaware No Drawing. Application May 2, 1949, Serial No. 91,000

5 Claims. (Cl. 260—249.7)

This invention relates to a process for preparing melamine. More particularly the invention relates to a method for preparing melamine from salts of cyanamide.

Previous methods for preparing melamine from cyanamide salts have involved dissolution of the salt in water, recovery of cyanamide, dimerization thereof and then a reaction under pressure to form the melamine.

It is an object of this invention to provide a process for forming melamine.

A further object is to provide a process for forming melamine from salts of cyanamide.

Still another object is to provide a process for forming melamine from salts of cyanamide directly without first isolating cyanamide or dicyandiamide.

These and other objects are attained by reacting substantially pure salts of cyanamide with ammonium salts under substantially anhydrous condition and in the presence of anhydrous ammonia.

The following examples are given in illustration and are not intended as limitations on the process of this invention. Where parts are mentioned they are parts by weight.

Example I

A substantially anhydrous mixture of 100 parts of calcium cyanamide and 130 parts of ammonium chloride was heated in a combustion tube at 350–400° C. A stream of anhydrous ammonia was passed through the reaction mixture throughout the reaction. Pure melamine sublimed as it was formed and was carried to the cold end of the combustion tube where it collected in substantially pure form. The melting point of the melamine obtained was 350–356° C.

When commercial calcium cyanamide was used, which is about 56% pure calcium cyanamide, the products were mainly decomposition products of melamine and very little pure melamine was obtained. The calcium cyanamide used in Example I had been refined prior to the reaction until it was substantially pure.

Example II

An anhydrous mixture of 126 parts of silver cyanamide and 55 parts of ammonium chloride was triturated and then heated in a combustion tube at 350–400° C. in the presence of a stream of anhydrous ammonia. Almost immediately pure melamine began to sublime and precipitate in crystalline form on the cool portions of the tube. Melamine continued to be formed and sublimed from the reaction zone until a yield of about 60% of theoretical was obtained. The melting point of the melamine was 350–356° C. indicating substantially pure melamine.

In place of the calcium or silver salts of cyanamide, other salts of cyanamide may be used such as the strontium, barium, lead, magnesium, aluminum, etc. salts.

The ammonium chloride shown in the examples may be replaced by other ammonium salts which do not decompose violently at the temperatures used. Preferred among the ammonium salts from an economic standpoint are ammonium chloride, ammonium sulfate, and ammonium phosphate. The amount of ammonium salt to be used should be the stoichiometric amount based on the cyanamide salt although a slight excess up to 10% above the stoichiometric amount may be used.

The temperature of the reaction must be maintained at or slightly above the temperature at which melamine sublimes i. e., 250–400° C.

During the reaction a stream of dry ammonia must be passed across the reacting materials to prevent decomposition of the melamine and to carry the sublimed material to the cooler parts of the reaction vessel or to a suitable condenser.

It is essential that all of the reactants used be in substantially pure and anhydrous condition throughout the reaction. Impurities present in large amounts, such as in commercial grades of calcium cyanamide, accelerate the breakdown of the melamine produced and any moisture will cause hydrolysis of the cyanamide before melamine can be formed.

The process of this invention provides a simple and economic method for preparing melamine directly from salts of cyanamide. It eliminates many of the steps in previous processes and also eliminates the need for using high pressures and the expensive apparatus necessary when using high pressures. Furthermore the product is substantially pure melamine and no refining steps are necessary.

It is obvious that variations may be made in the processes of this invention without departing from the spirit and scope thereof as defined in the appended claims.

What is claimed is:

1. A process for preparing melamine which comprises reacting substantially pure metal salts of cyanamide with an ammonium salt taken from the group consisting of ammonium chloride, ammonium sulfate and ammonium phosphate at 300–400° C. and substantially atmospheric pressure under anhydrous conditions, and passing a stream of anhydrous ammonia across the reacting materials throughout the duration of the reaction.

2. A process as in claim 1 wherein the cyanamide salt is calcium cyanamide.

3. A process as in claim 1 wherein the cyanamide salt is silver cyanamide.

4. A process as in claim 1 wherein the ammonium salt is ammonium chloride.

5. A process as in claim 4 wherein the cyanamide salt is calcium cyanamide.

HENRY A. WALTER.

REFERENCES CITED

The following references are of record in the file of this patent:

UNITED STATES PATENTS

| Number | Name | Date |
| --- | --- | --- |
| 2,221,478 | Hill | Nov. 12, 1940 |
| 2,431,301 | Wright | Nov. 18, 1947 |

FOREIGN PATENTS

| Number | Country | Date |
| --- | --- | --- |
| 527,697 | Great Britain | 1940 |
| 113,064 | Australia | 1941 |